April 12, 1966     I. B. MARGILOFF     3,245,721

FLAME WORKING MINERALS

Filed June 7, 1962

*INVENTOR:*
IRWIN B. MARGILOFF
BY
ATTORNEY

United States Patent Office 3,245,721
Patented Apr. 12, 1966

3,245,721
FLAME WORKING MINERALS
Irwin B. Margiloff, 201 E. 19th St., New York, N.Y.
Filed June 7, 1962, Ser. No. 200,769
1 Claim. (Cl. 299—14)

This invention relates in general to a method for melting minerals, and, more particularly, to a method for cutting, shaping, quarrying and melting stone, brick, and other like minerals.

The cutting and shaping of stone and masonry material is an art that has required expensive cutting tools such as chisels, diamond drills, abrasives, explosives and other specialized devices. In the quarrying of stone, or in tunneling through stone formations, the process of removing the stone is usually intermittent because explosives are used which require the periodic evacuation of the working area.

It is, therefore, a main object of this invention to provide a method for the melting of mineral materials, such as stone, which is accomplished in a continuous and safe manner.

Another object of this invention is to melt stone and other refractory minerals and materials by directing a high temperature stream of gas, produced by the passage of the gas through an electric arc, against the material to be melted while adding a flux to the material to be melted which lowers the melting temperature of the resulting mixture of the flux and the material to be melted.

A further object of this invention is to provide a method for quarrying rock or other minerals by directing a stream of gases to an extremely high temperature, adding a pulverized flux material to the stream of heated gases, directing the heated stream of gases containing the pulverized flux against the rock or mineral to be quarried, moving the stream of gases across the face of the rock to be quarried forming a kerf as plastic flow takes place from the heated area, and forming additional kerfs in the same manner so that the kerfs join to separate a piece of quarried rock.

Still another object of this invention is to provide a method whereby stone, minerals, or other refractory materials may be welded or joined together by directing a stream of gases through an electric arc to heat the gases, adding a fluxing material to the stream of heated gases, and directing the stream of heated gases and the fluxing material at a joint between two pieces of refractory material, the fluxing material combining with the refractory material so that the resulting mixture melts at a lower temperature and flows together bonding the pieces of refractory material upon cooling.

Figure 1:
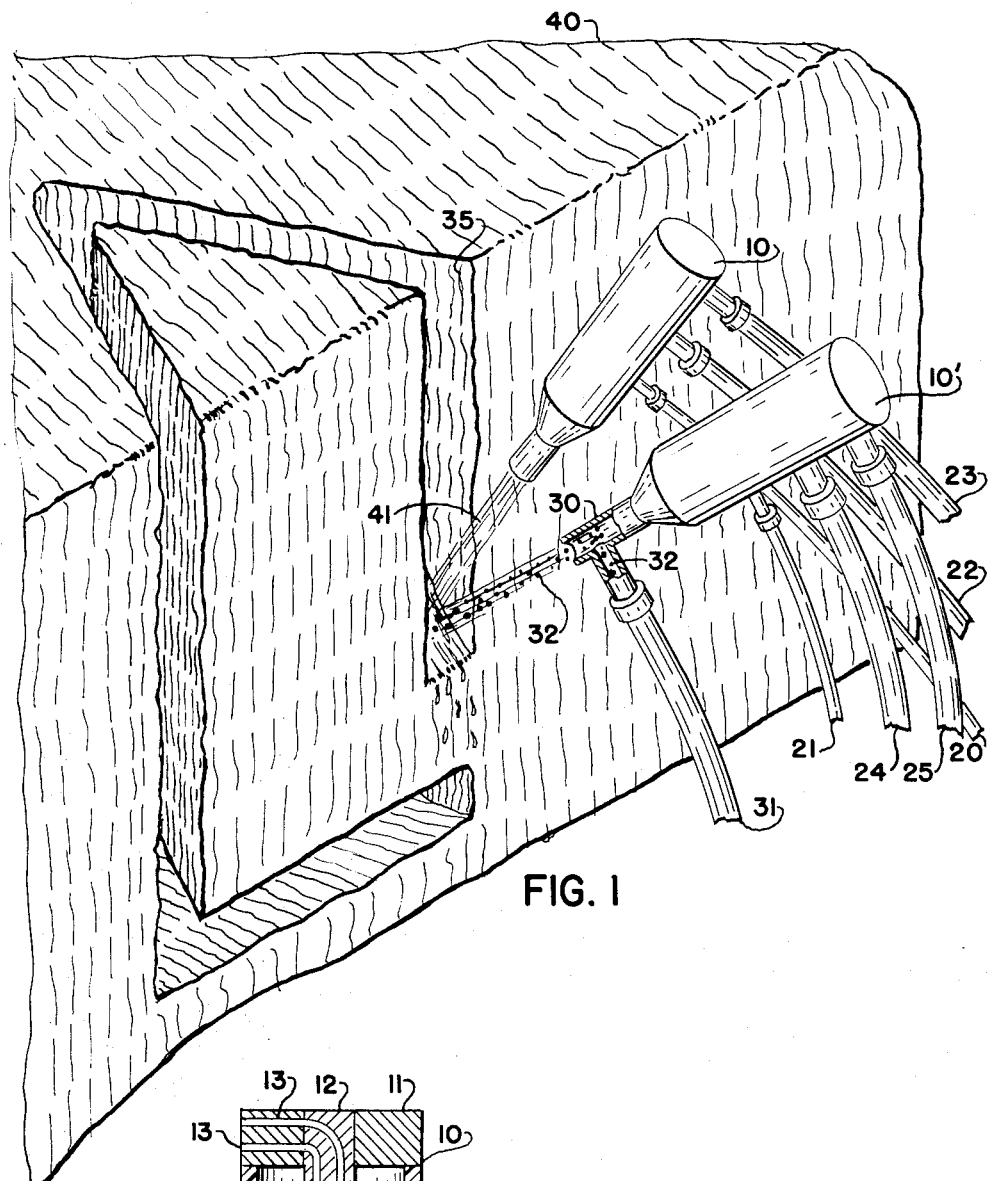
Figure 2:
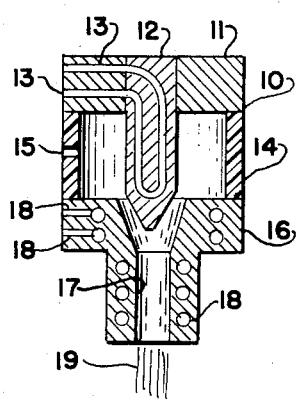

Many other objects, advantages and features of invention reside in the practice of this invention as will be understood from the following description and accompanying drawing wherein:

FIGURE 1 is a perspective view of a piece of rock, mineral, or other refractory material being quarried according to my invention using two plasma torches, one of which is partly cut away in longitudinal section to show the addition of a pulverized flux material; and FIGURE 2 is a vertical longitudinal section through a plasma torch of the general type which may be used in the practice of my invention.

Referring to the drawing in detail, FIGURE 2 shows a typical plasma torch 10. This torch has a rear plate 11 which supports the central electrode 12. Cooling water passes through the passages 13 in the rear plate 11 and in the electrode 12 to cool the electrode 12 during its operation. An insulating member or jacket 14 extends in front of the rear plate 11 about the electrode 12. A gas or gases to be heated are introduced under pressure though aperture 15 in the insulating member 14. A nozzle and outer electrode 16 is fixed to the front of the insulating member 14 and contains the central passage 17. Cooling water flows through the passages 18 to cool the outer electrode 16. A suitable current source (not shown) is connected to the electrodes 16 and 12 so that an arc is formed within the passage 17 between the electrodes 12 and 16. Gas or gases to be heated flow from the insulating member 14 through the passage 17 and are heated by their passing through the arc to an extremely high temperature. These heated gases emerge from the nozzle and outer electrode 16 as the plasma jet 19.

As shown in FIGURE 1, a suitable gas is supplied to the plasma torches 10 and 10' through the gas hoses 20 and 21. Electric power and cooling water are supplied to the torch 10 through the water cooled cables 22 and 23 while electric power and cooling water are supplied to the torch 10' through the cables 24 and 25. Torch 10' is identical to the torch 10, which has been described in detail, except that torch 10' has added to it a mixing nozzle 30. A hose 31 supplies a stream of flux particles 32 to the mixing nozzle 30. To aid in mixing and metering the particles 32 into the plasma jet flowing from the plasma torch 10', a gas is introduced through the hose 31 which will mix with the plasma jet issuing from nozzle 30.

In operation, a high temperature stream of gas is generated by torch 10'. A stream of flux particles enters the stream of high temperature gas in the mixing nozzle 30 and these particles flow out of nozzle 30 with the heated plasma jet. The particles of flux in the plasma jet will become molten and impinge upon the portion of the kerf 35 at which the stream of gases and flux is directed. As the rock, stone, mineral or other refractory material 40 is heated by the plasma jet from torch 10', the particles 32 of the molten flux will combine with the refractory material 40. If a suitable flux material is used, the combination of the flux and the refractory material will have a relatively lower melting temperature than will the refractory material alone. Thus the material in that portion of the kerf 35 at which torch 10' is directed will become molten and fairly fluid so that, under some circumstances, the action of gravity alone will be sufficient to drain away the melt. In this case, the melting is continued to extend the kerf 35 and the torch 10 is not required.

However, to accelerate the removal of the melt within the kerf 35, torch 10 may direct another plasma jet 41 having a high kinetic energy against the molten portion of the kerf 35 to clear melted material away with the action of its higher velocity stream 41. When thin sections are cut or if two stone members are being bonded by fusing material between them together, the torch 10 will generally not be needed. Further, in some cases, an unheated jet of gas may be adequate to clear the melted material away. The plasma jet torches 10 and 10' are shown unsupported in FIGURE 1, however, in large-scale operations, as in quarrying, shaping large blocks, or cutting through thick masonry, the necessarily large sizes of the torches 10 and 10' and the required precision of the cut being made will necessitate mechanical means (not shown) to support the torches 10 and 10' and direct their cutting path.

If it is desired, a refractory surface may be glazed by merely directing the flux containing plasma jet of torch 10' against its surface. A lower temperature melting mixture will be formed by the flux and the refractory material on the surface which will harden into a glass-like coating. After digging a tunnel through rock, one or more torches 10' may be used to glaze the walls of the tunnel which will then not need to be conventionally sprayed with concrete to provide a hard, smooth surface that will reduce the danger of rock falls and water seepage.

This invention enjoys an advantage in that work at a tunnel or quarry face may proceed continuously uninterrupted by the periodic removal of personnel and machinery during conventional blasting operations. Thus quarried blocks may be removed continuously and the apparatus used need not be periodically stopped to replace conventional expensive cutting surfaces which wear rapidly. Further, this invention may be used in the construction industry to cut holes in masonry walls, seal up openings, and to bond brick and other refractory building materials. In the bonding of brick, stone or concrete, the sealing of the spaces between pieces being bonded may be accomplished by melting the pieces together and adding enough new refractory material and flux to provide a well filled joint. Added material may be fed into the joint in the same manner as welding rod is fed into a metal weld. Filler material may also be added as a granular material poured into the spaces to be sealed before or while the heat of fusion is applied. In such a case, the flux may be mixed with the refractory material and added with it rather than adding it through the mixing nozzle 30 of a torch 10'. The particular manner in which the flux is added will vary with different circumstances, but it is most simply added by the mixing nozzle 30 and deposited with a plasma jet. Using this method, the flux is well melted by its longer exposure within the high temperature plasma jet so that it more easily combines with the refractory material.

As an example of the fluxes which may be used to melt refractory materials, refractories containing moderate percentages of such materials as quartz, felspar, and clay may be melted using a flux of borax, soda ash, cryolite, or fluorspar which are basic in character and react with the acidic refractories to form a lower melting melt. If a given mineral, stone, or refractory material is formed from a moderate percentage of one or more of the felspars, such as potash felspar, soda felspar, or lime felspar, the flux will cause the felspar to melt and flow and carry with it any included particles of a higher melting material which might not react with the flux.

In the cutting or melting of felspars, a preferred flux consists of a pulverized mixture of borax, 40 parts, soda ash, 6 parts, and calcium fluoride, 10 parts. However, to cut brick most effectively, the flux should contain a much higher percentage of borax.

Further, in the cutting of felspars, argon, helium, nitrogen or hydrogen gas may be introduced through the plasma torches 10 and 10'. In the cutting of some minerals, air or steam may be introduced through the torches 10 and 10' if oxides having undesirable higher melting temperatures are not formed.

While I have disclosed my invention in the best forms known to me, it will nevertheless be understood that these are purely exemplary and that modifications may be made without departing from the spirit of the invention except as it may be more limited in the appended claim wherein I claim:

In a method of removing a first body of solid mineral material from a second larger body of solid mineral material the improvement comprising the steps of:

(a) heating a first flowing stream of non-oxidizing gas by passage through an electric arc;
(b) adding flux to said heated gas;
(c) directing heated gas and flux against the solid surface of said mineral material;
(d) melting mineral material;
(e) removing molten mineral material from said solid surface by application of a second stream of hot gas;
(f) forming kerfs in said second body; and
(g) intersecting said kerfs and removing one body from the other.

References Cited by the Examiner

UNITED STATES PATENTS

| | | | |
|---|---|---|---|
| 1,494,003 | 5/1924 | Malcher | 175—13 X |
| 2,286,191 | 6/1942 | Aitchison et al. | 175—13 |
| 2,426,688 | 9/1947 | Higgs | 209—14 |
| 2,742,555 | 4/1956 | Murray | 175—16 |
| 2,874,265 | 2/1959 | Reed et al. | 219—121 |
| 3,004,137 | 10/1961 | Karlovitz | 175—16 X |
| 3,019,004 | 1/1962 | Vasselin | 262—1 |

CHARLES E. O'CONNELL, *Primary Examiner.*

BENJAMIN HERSH, *Examiner.*